Figure 1:
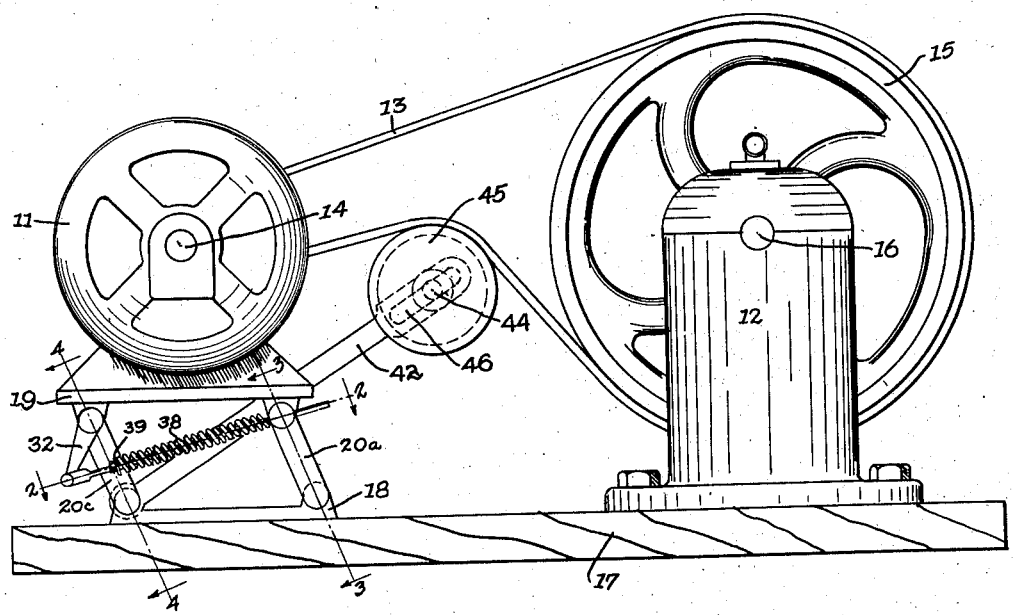

June 2, 1925.

C. E. BUCKBEE 1,540,720

POWER TRANSMISSION

Filed Jan. 5, 1924

Charles E. Buckbee
Inventor
by *Sun Hand Freeman* Attorneys

Patented June 2, 1925.

1,540,720

UNITED STATES PATENT OFFICE.

CHARLES E. BUCKBEE, OF DETROIT, MICHIGAN.

POWER TRANSMISSION.

Application filed January 5, 1924. Serial No. 684,659.

*To all whom it may concern:*

Be it known that I, CHARLES E. BUCKBEE, a citizen of the United States, residing at Detroit, in the county of Wayne and State of Michigan, have invented a certain new and useful Improvement in Power Transmissions, of which the following is a full, clear, and exact description, reference being had to the accompanying drawings.

Figure 2:
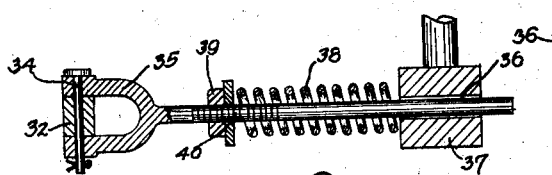
Figure 3:
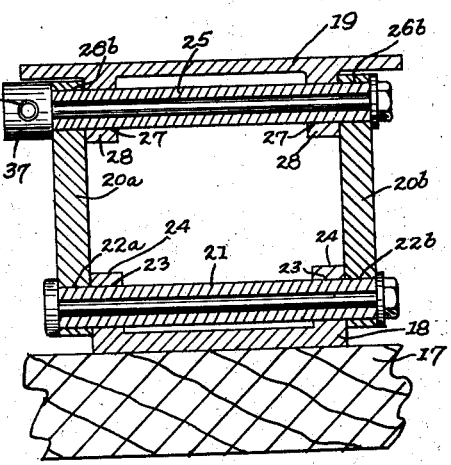
Figure 4:
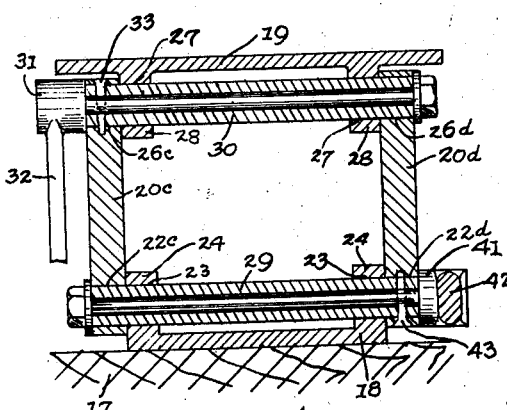

My invention relates to power transmission and the principal object of my invention is to produce a new and improved arrangement for maintaining tight the belt operatively connecting two or more machine elements. In the drawings accompanying this specification and forming a part thereof I have shown, for purposes of illustration, one form which my invention may assume. In these drawings:

Figure 1 represents a side elevation of this illustrative embodiment of my invention, while Figures 2, 3, and 4 are sections respectively on the lines 2—2, 3—3, and 4—4 of Figure 1.

In the drawings I have illustrated my invention as applied to that combinatin of machine elements wherein an electric motor 11 acts as the driving element, a gas compressor 12 as the driven element, and the means for transmitting power is a belt 13 passing over a pulley (not shown) on the shaft 14 of the motor 11 and a pulley 15 on the shaft 16 of the compressor 12.

The motor 11 is herein shown as supported from the unit base 17 by means of a movable connection comprising a fixed base 18 rigidly secured to the unit base 17, a movable base 19 rigidly secured to the motor 11, and a plurality of parallel links 20 each pivoted at one end to the fixed base 18 and at the other end to the movable base 19. In the embodiment herein illustrated these parallel links 20 are shown as four in number arranged in two pairs disposed respectively at the two ends of the bases 18 and 19, the pair of links 20ª and 20ᵇ at the inner end of the bases 18 and 19 are pivoted to the fixed base 18 by means of a bolt 21 passing through apertures 22ª and 22ᵇ in the links 20ª and 20ᵇ and apertures 23 in a pair of ears 24 rising from the base plate 18 and to the movable base 19 by means of a bolt 25 passing through apertures 26ª and 26ᵇ in the links 20ª and 20ᵇ and apertures 27 in a pair of ears 28 depending from the movable base 19, and the outer pair of links 20ᶜ and 20ᵈ are pivoted to the fixed base 18 by means of a bolt 29 passing through apertures 22ᶜ and 22ᵈ in the links 20ᶜ and 20ᵈ and apertures 23 in a second pair of ears 24 rising from the fixed base 18 and to the movable base 19 by means of a bolt 30 passing through the apertures 26ᶜ and 26ᵈ in the links 20ᶜ and 20ᵈ and the apertures 27 in a second pair of ears 28 depending from the movable base 19.

Formed integral with the head 31 of the bolt 30 is an arm 32 made unitary with the link 20ᶜ by a pin 33 rigidly connecting the bolt 30 and link 20ᶜ. To the free end of this arm 32 is pivoted, by means of a pivot pin 34, a rod 35 which extends diagonally upward and through the aperture 36 in a head 37 formed integral with the bolt 25 and is surrounded by a spring 38 compressed between the head 37 and a nut 39 adjustable along the screw threaded portion 40 of the rod 35.

Formed integral with the head 41 of the bolt 29 is an arm 42 made unitary with the link 20ᵈ by means of a pin 43 rigidly connecting the bolt 29 and the link 20ᵈ. This arm 42 is provided at its free end with a slot 46 arranged to adjustably receive the shaft 44 of an idler pulley 45 whereby the shaft 44 of the idler pulley 45 may be clamped to the arm 42 in any desired position.

From the above description it will be understood that the weight of the motor 11 constantly tends to move the motor 11 downwardly and outwardly, that any such movement of the motor 11 is accompanied by a movement of the arm 32 toward the head 37 and a consequent compression of the spring 38, and that any such movement of the motor 11 is also accompanied by an upward movement of the arm 42 and the idler pulley 45 carried thereby. It will be readily understood, therefore, that the weight of the motor is constantly acting to maintain the belt 13 tight both by constantly acting to move the motor 11 further from the compressor 12 and by constantly acting to raise the idler pulley 45 to increase the length of the belt path, and in addition it will be understood that the constantly increasing opposition of the spring 38 to the action of the motor 11 as the motor 11 moves downwardly and acts with increasing force will maintain substantially constant the net force with which the motor acts.

It will be obvious to those skilled in the art that the particular embodiment herein shown and disclosed may be variously changed and modified without sacrificing the advantages of my invention or departing from the spirit thereof and it will therefore be understood that the disclosure herein is illustrative only and my invention is not limited thereto.

I claim:

1. In combination, a driven element, a driving element, a belt operatively connecting said elements, an idler pulley engaging said belt, and means supporting one of said elements and said idler pulley in such manner that it continally tends to move, under the influence of its own weight, in a direction to directly tighten said belt and in addition to force said idler pulley against said belt to further tighten said belt, and a spring connected to maintain the tightening force substantially constant over the range of movement of said element.

2. In combination, a driven element, a driving element, a belt operatively connecting said elements, an idler pulley engaging said belt, and means supporting one of said elements and said idler pulley in such manner that said element continually tends to move, under the influence of its own weight, in a direction to force said idler pulley against said belt to thereby tighten said belt, and a spring connected to maintain the tightening force substantially constant over the range of movement of said element.

3. In combination, a driven element, a driving element, a belt operatively connecting said elements, means supporting one of said elements in such manner that it continually tends to move, under the influence of its own weight, in a direction to tighten said belt, and a spring, connected between two moving parts of said support between which the distance varies upon belt tightening movement of said support, to maintain the tightening force substantially constant over the range of movement of said element.

In testimony whereof, I hereunto affix my signature.

CHARLES E. BUCKBEE.